United States Patent
Oh et al.

(10) Patent No.: US 12,204,374 B2
(45) Date of Patent: Jan. 21, 2025

(54) ELECTRONIC DEVICE INCLUDING FLEXIBLE DISPLAY

(71) Applicant: Samsung Electronics Co., Ltd., Suwon-si (KR)

(72) Inventors: Myeongsu Oh, Suwon-si (KR); Kiyoung Jung, Suwon-si (KR); Yongyoun Kim, Suwon-si (KR); Jungchul An, Suwon-si (KR); Duho Chu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 18/146,771

(22) Filed: Dec. 27, 2022

(65) Prior Publication Data
US 2023/0205276 A1   Jun. 29, 2023

Related U.S. Application Data

(63) Continuation of application No. PCT/KR2022/021382, filed on Dec. 27, 2022.

(30) Foreign Application Priority Data

Dec. 27, 2021 (KR) .................. 10-2021-0188446
Feb. 9, 2022 (KR) .................. 10-2022-0017061

(51) Int. Cl.
*G06F 1/16* (2006.01)
*H01Q 1/22* (2006.01)

(52) U.S. Cl.
CPC .......... *G06F 1/1652* (2013.01); *G06F 1/1618* (2013.01); *G06F 1/1681* (2013.01); *G06F 1/1698* (2013.01); *H01Q 1/2266* (2013.01)

(58) Field of Classification Search
CPC .... G06F 1/1652; G06F 1/1618; G06F 1/1681; G06F 1/1698; G06F 1/16; G06F 1/1616;
(Continued)

(56) References Cited

U.S. PATENT DOCUMENTS

2005/0225952 A1   10/2005   Takagi
2019/0070760 A1   3/2019   Huang et al.
(Continued)

FOREIGN PATENT DOCUMENTS

CN   106785344 A   5/2017
CN   107896461 A   4/2018
(Continued)

OTHER PUBLICATIONS

International Search Report dated Apr. 4, 2023, issued in International Application No. PCT/KR2022/021382.

*Primary Examiner* — Daniel D Chang
(74) *Attorney, Agent, or Firm* — Jefferson IP Law, LLP

(57) ABSTRACT

According to various embodiments of the disclosure, an electronic device may comprise a first housing, a second housing connected to the first housing by a hinge structure and providing a motion relative to the first housing, and a flexible display disposed from the first housing through the hinge structure to the second housing, at least a portion of at least one of the first housing or the second housing may include at least two antennas and a segmenter disposed between the antennas, a separation member may be disposed adjacent to a portion of the segmenter in a direction to the flexible display, and at least a portion of the separation member may protrude beyond the antennas toward the flexible display.

20 Claims, 15 Drawing Sheets

(58) Field of Classification Search
CPC ...... G06F 1/1656; H01Q 1/2266; H01Q 1/24; H01Q 9/42; H01Q 21/28; H01Q 1/243; H04M 1/02
See application file for complete search history.

(56) References Cited

U.S. PATENT DOCUMENTS

| | | |
|---|---|---|
| 2019/0081396 A1 | 3/2019 | Zhou et al. |
| 2019/0103656 A1 | 4/2019 | Shi et al. |
| 2020/0136231 A1* | 4/2020 | Lee .................. H05K 1/118 |
| 2020/0195336 A1 | 6/2020 | Raghavan et al. |
| 2020/0235459 A1 | 7/2020 | Chun et al. |
| 2020/0266524 A1* | 8/2020 | Yoon .................. H01Q 13/16 |
| 2021/0037126 A1 | 2/2021 | Yoo et al. |
| 2021/0105894 A1 | 4/2021 | Oh et al. |
| 2021/0377372 A1 | 12/2021 | Jung et al. |

FOREIGN PATENT DOCUMENTS

| | | |
|---|---|---|
| CN | 110212287 A | 9/2019 |
| CN | 112272479 A | 1/2021 |
| KR | 10-2019-0029438 A | 3/2019 |
| KR | 10-2020-0046399 A | 5/2020 |
| KR | 10-2165647 B1 | 10/2020 |
| KR | 10-2021-0040699 A | 4/2021 |

* cited by examiner

ELECTRONIC DEVICE INCLUDING FLEXIBLE DISPLAY

CROSS-REFERENCE TO RELATED APPLICATION(S)

This application is a continuation application, claiming priority under § 365(c), of an International application No. PCT/KR2022/021382, filed on Dec. 27, 2022, which is based on and claims the benefit of a Korean patent application number 10-2021-0188446, filed on Dec. 27, 2021, in the Korean Intellectual Property Office, and of a Korean patent application number 10-2022-0017061, filed on Feb. 9, 2022, in the Korean Intellectual Property Office, the disclosure of each of which is incorporated by reference herein in its entirety.

TECHNICAL FIELD

Various embodiments of the disclosure relate to an electronic device including a foldable display.

BACKGROUND ART

Advancing information communication and semiconductor technologies accelerate the spread and use of various electronic devices. In particular, recent electronic devices are being developed to carry out communication while carried on.

The term "electronic device" may mean a device performing a particular function according to its equipped program, such as a home appliance, an electronic scheduler, a portable multimedia player, a mobile communication terminal, a tablet personal computer (PC), a video/sound device, a desktop PC or laptop computer, a navigation for automobile, etc. For example, electronic devices may output stored information as voices or images. As electronic devices are highly integrated, and high-speed, high-volume wireless communication becomes commonplace, an electronic device, such as a mobile communication terminal, is recently being equipped with various functions. For example, an electronic device comes with the integrated functionality, including an entertainment function, such as playing video games, a multimedia function, such as replaying music/videos, a communication and security function for mobile banking, and a scheduling or e-wallet function. Such electronic devices become compact enough for users to carry in a convenient way.

As mobile communication services extend up to multimedia service sectors, the display of the electronic device may be increased to allow the user satisfactory use of multimedia services as well as voice call or text messaging services. Accordingly, a foldable flexible display may be disposed on the entire area of the housing structure separated to be foldable.

DISCLOSURE

Technical Problem

The bar-type structure is waterproof over its entire area. However, the housing with a foldable display happens to have an unfixed structure due to the placement of the foldable flexible display over the entire area of the housing structure.

As a plurality of components are used in the foldable part, a gapped space between the components may be created, and foreign objects may enter the gapped space. If a dielectric foreign object, such as impure water, may penetrate causing conduction between a plurality of separated antennas, the communication performance of the electronic device may degrade.

According to various embodiments of the disclosure, there may be provided a structure capable of preventing degradation of communication performance of the electronic device by preventing conduction between the plurality of separated antennas.

Technical Solution

According to various embodiments of the disclosure, an electronic device may comprise a first housing, a second housing connected with the first housing by a hinge structure and providing a motion relative to the first housing, and a flexible display disposed from the first housing through the hinge structure to the second housing. At least a portion of at least one of the first housing or the second housing may include at least two antennas and a segmenter disposed between the antennas. A separation member may be disposed adjacent to a portion of the segmenter in a direction to the flexible display. At least a portion of the separation member may protrude beyond the antennas toward the flexible display.

According to various embodiments of the disclosure, an electronic device may comprise a first housing, a second housing connected with the first housing by a hinge structure and providing a motion relative to the first housing, a flexible display disposed from the first housing through the hinge structure to the second housing, and a plate disposed on a lower surface of the flexible display. At least a portion of at least one of the first housing or the second housing may include at least two antennas and a segmenter disposed between the antennas. At least one adhesive member may be disposed between at least one of the first housing or the second housing and the plate. The plate may include a plate protrusion formed to protrude toward the antennas. At least a portion of the adhesive member may be formed to protrude toward the protrusion.

Advantageous Effects

According to various embodiments of the disclosure, it is possible to prevent degradation of communication performance of the electronic device by preventing conduction between the plurality of separated antennas.

MODE FOR INVENTION

Figure 1:
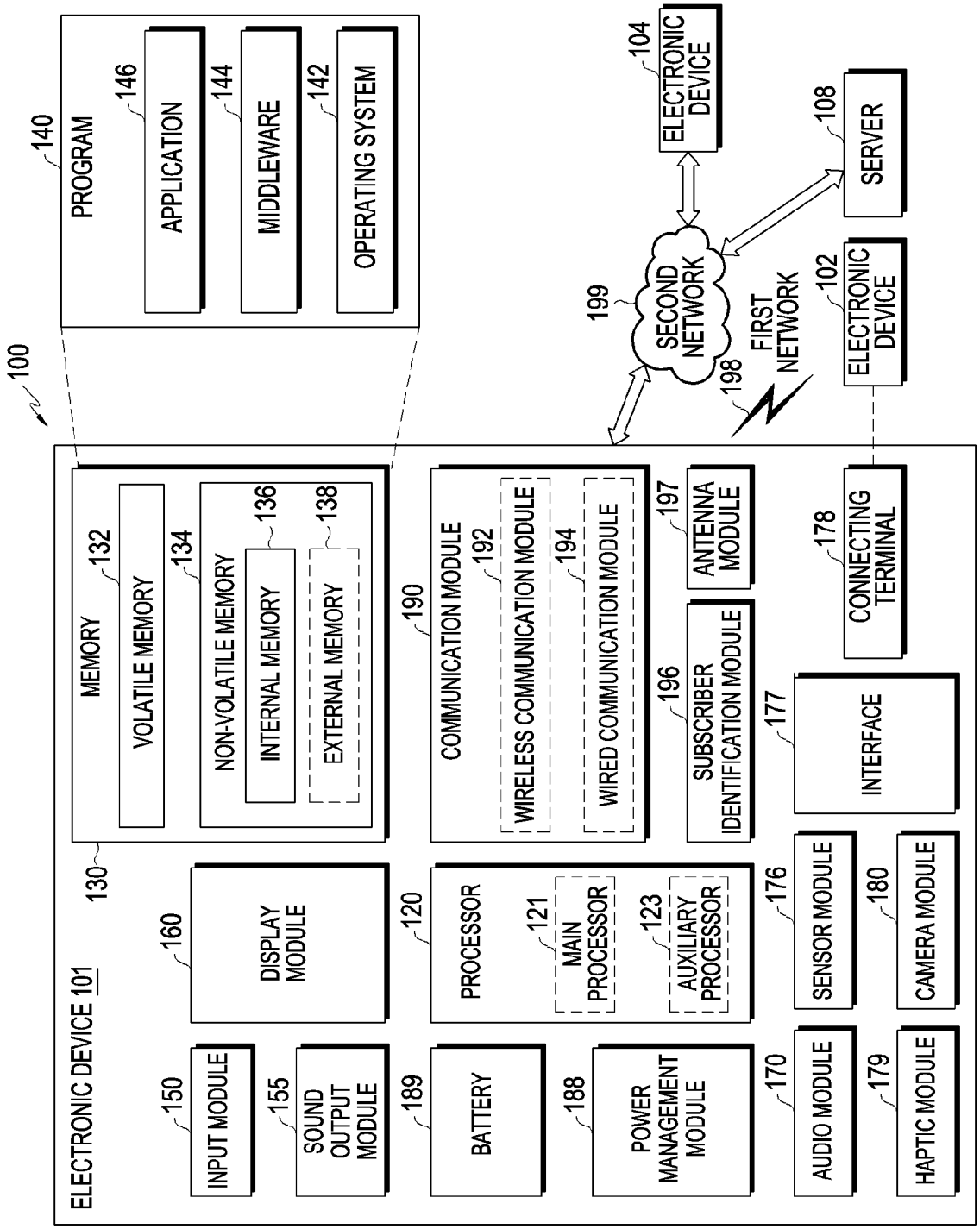
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., local area network (LAN) or wide area network (WAN))). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
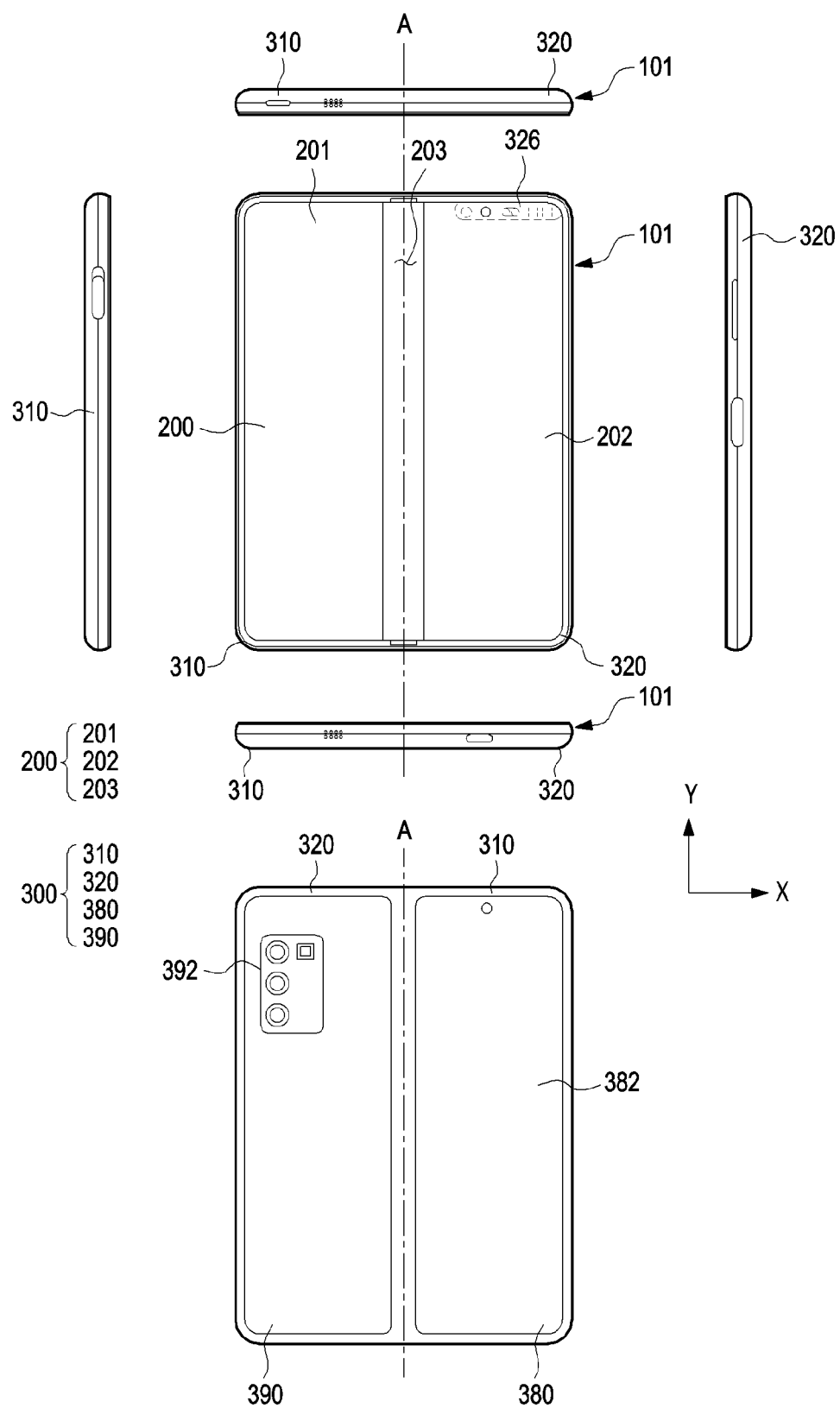
FIG. 2 is a view illustrating an unfolded status among folding statuses of a foldable electronic device according to an embodiment of the disclosure.

FIG. 2 is a view illustrating an unfolded status among folding statuses of a foldable electronic device according to an embodiment of the disclosure.

Figure 3:
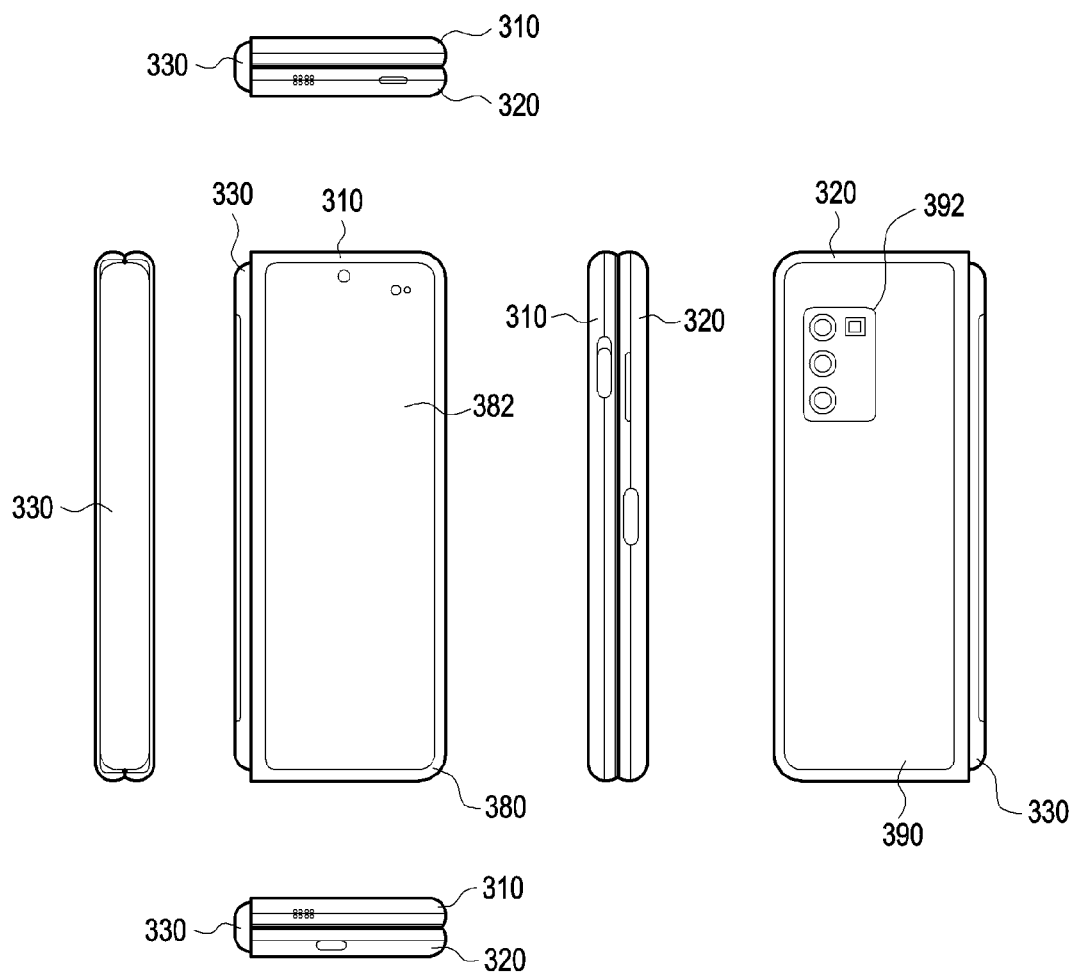
FIG. 3 is a view illustrating a folded status among folding statuses of a foldable electronic device according to an embodiment of the disclosure.

FIG. 3 is a view illustrating a folded status among folding statuses of a foldable electronic device according to an embodiment of the disclosure.

Referring to FIGS. 2 and 3, a foldable electronic device (hereinafter, an electronic device 101) may include a foldable housing 300, a hinge case (e.g., hinge case 330 of FIG. 3) (e.g., a hinge cover) covering a foldable portion of the foldable housing 300, and a flexible or foldable display 200 (hereinafter, simply "display 200") (e.g., the display module 160 of FIG. 1) disposed in a space formed by the foldable housing 300. According to an embodiment, the surface on which the display 200 is disposed is defined as a front surface of the electronic device 101. The opposite surface of the front surface is defined as a rear surface of the electronic device 101. Further, the surface surrounding the space between the front and rear surfaces is defined as a side surface of the electronic device 101.

Figure 4:
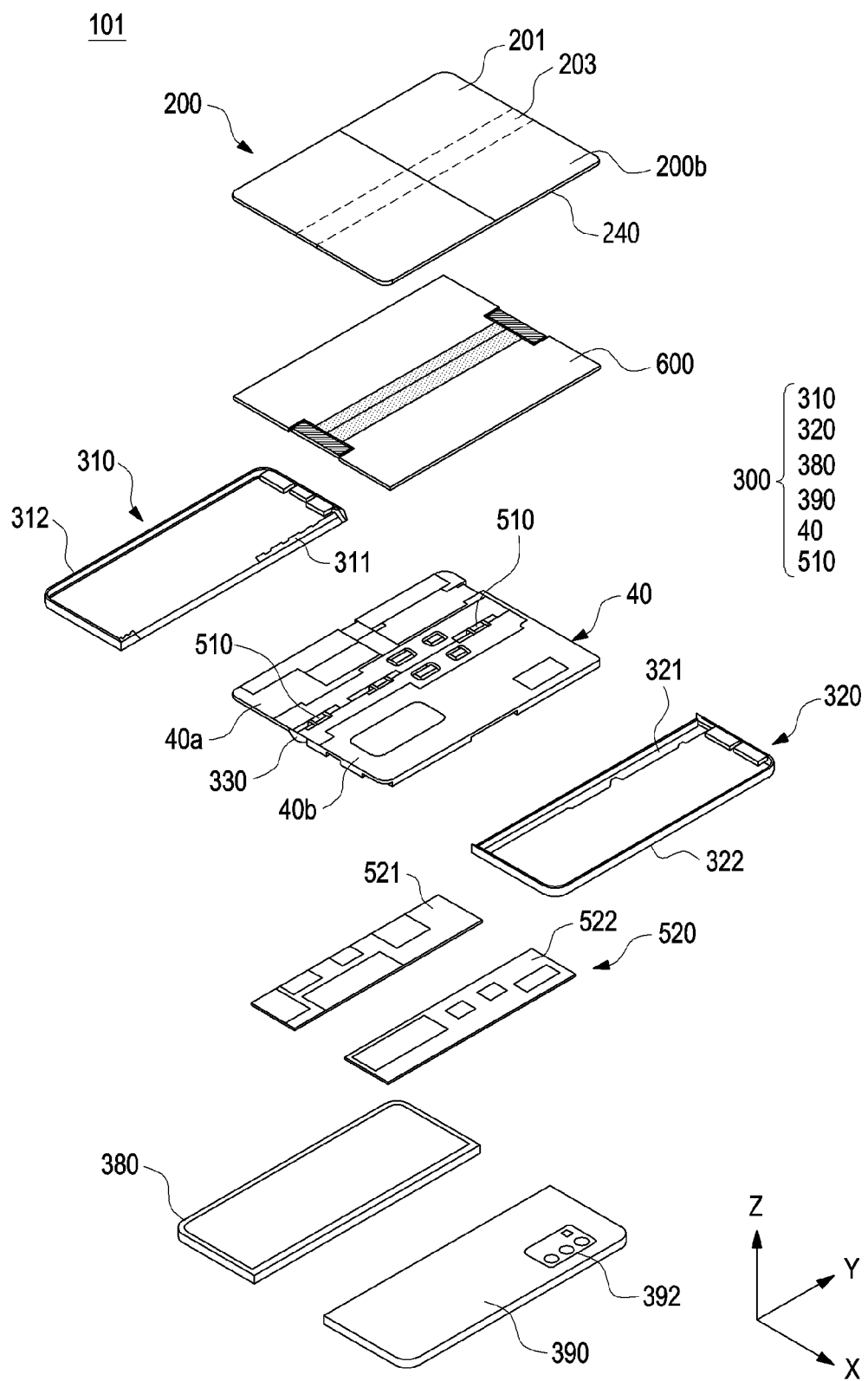
FIG. 4 is an exploded perspective view illustrating a foldable electronic device according to an embodiment of the disclosure.

According to various embodiments, the foldable housing 300 may include a first housing structure 310, a second housing structure 320 including a sensor area 326, a first rear cover 380, a second rear cover 390, and a hinge structure (e.g., hinge structure 510 of FIG. 4). The foldable housing 300 of the electronic device 101 are not limited to the shape and coupling shown in FIGS. 2 and 3 but may rather be implemented in other shapes or via a combination and/or coupling of other components. For example, the first housing structure 310 and the first rear cover 380 may be integrally formed with each other, and the second housing structure 320 and the second rear cover 390 may be integrally formed with each other.

According to various embodiments, the first housing structure 310 may be connected to the hinge structure (e.g., the hinge structure 510 of FIG. 4) and may include a first surface facing in a first direction and a second surface facing in a second direction opposite to the first direction. The second housing structure 320 may be connected to the hinge structure 510 and may include a third surface facing in a third direction and a fourth surface facing in a fourth direction opposite to the third direction, and may rotate from the first housing structure 310 on the hinge structure 510. Thus, the electronic device 101 may turn into a folded state or unfolded state. In the folded state of the electronic device 101, the first surface may face the third surface and, in the unfolded state, the third direction may be identical to the first direction.

According to various embodiments, the first housing structure 310 and the second housing structure 320 may be disposed on both sides of the folding axis A, and may have an overall symmetrical shape with respect to the folding axis A. As is described below, the angle or distance between the first housing structure 310 and the second housing structure 320 may be varied depending on whether the electronic device 101 is in the unfolded state, the folded state, or the partially unfolded intermediate state. According to an embodiment, the second housing structure 320 further includes the sensor area 326 where various sensors are disposed, unlike the first housing structure 310 but, in the remaining area, the second housing structure 320 may be symmetrical in shape with the first housing structure 310.

According to various embodiments, at least a portion of the first housing structure 310 and the second housing structure 320 may be formed of a metal or a non-metal material having a predetermined degree of rigidity to support the display 200. At least a portion formed of metal may provide a ground plane of the electronic device 101 and may be electrically connected with a ground line formed on a printed circuit board (e.g., printed circuit board 520 of FIG. 4).

According to various embodiments, the sensor area 326 may be formed adjacent to a corner of the second housing structure 320 and to have a predetermined area. However, the placement, shape, or size of the sensor area 326 is not limited to those illustrated. For example, in another embodiment, the sensor area 326 may be provided in a different corner of the second housing structure 320 or in any area between the top corner and the bottom corner. In an embodiment, components for performing various functions, embedded in the electronic device 101, may be visually exposed through the sensor area 326 or one or more openings in the sensor area 326 to the front surface of the electronic device 101. In various embodiments, the components may include various kinds of sensors. The sensor may include at least one of, e.g., a front-facing camera, a receiver, or a proximity sensor.

According to various embodiments, the first rear cover 380 may be disposed on one side of the folding axis A on the rear surface of the electronic device 101 and have, e.g., a substantially rectangular periphery which may be surrounded by the first housing structure 310. Similarly, the second rear cover 390 may be disposed on the opposite side of the folding axis on the rear surface of the electronic device 101 and its periphery may be surrounded by the second housing structure 320.

According to various embodiments, the first rear cover 380 and the second rear cover 390 may be substantially symmetrical in shape with respect to the folding axis (axis A). However, the first rear cover 380 and the second rear cover 390 are not necessarily symmetrical in shape. In another embodiment, the electronic device 101 may include the first rear cover 380 and the second rear cover 390 in various shapes. According to another embodiment, the first rear cover 380 may be integrally formed with the first housing structure 310, and the second rear cover 390 may be integrally formed with the second housing structure 320.

According to various embodiments, the first rear cover 380, the second rear cover 390, the first housing structure 310, and the second housing structure 320 may form a space where various components (e.g., a printed circuit board or battery) of the electronic device 101 may be disposed. According to an embodiment, one or more components may be arranged or visually exposed on/through the rear surface of the electronic device 101. For example, at least a portion of a sub display may be visually exposed through a first rear surface area 382 of the first rear cover 380. In another embodiment, one or more components or sensors may be visually exposed through a second rear surface area 392 of the second rear cover 390. According to various embodiments, the sensor may include a proximity sensor and/or a rear-facing camera.

According to various embodiments, a front camera visually exposed to the front surface of the electronic device 101 through one or more openings prepared in the sensor area 326 or a rear camera exposed through the second rear surface area 392 of the second rear cover 390 may include one or more lenses, an image sensor, and/or an image signal processor. The flash may include, e.g., a light emitting diode (LED) or a xenon lamp. According to an embodiment, two or more lenses (an infrared (IR) camera, a wide-angle lens, and a telephoto lens) and image sensors may be disposed on one surface of the electronic device 101.

Referring to FIG. 3, the hinge case 330 may be disposed between the first housing structure 310 and the second housing structure 320 to hide the internal components (e.g., the hinge structure 510 of FIG. 4). According to an embodiment, the hinge case 330 may be hidden by a portion of the first housing structure 310 and second housing structure 320 or be exposed to the outside depending on the folding state (e.g., the unfolded state, intermediate state, or folded state) of the electronic device 101.

According to an embodiment, as shown in FIG. 2, in the unfolded state of the electronic device 101, the hinge case 330 may be hidden, and thus not exposed, by the first housing structure 310 and the second housing structure 320. As another example, as shown in FIG. 3, in the folded state (e.g., a fully folded state) of the electronic device 101, the hinge case 330 may be exposed to the outside between the first housing structure 310 and the second housing structure 320. As another example, in an intermediate state in which the first housing structure 310 and the second housing structure 320 are folded with a certain angle, the hinge case 330 may be partially exposed to the outside between the first housing structure 310 and the second housing structure 320. In this case, however, the exposed area may be smaller than in the fully folded state. According to an embodiment, the hinge case 330 may include a curved surface.

According to various embodiments, the display 200 may be disposed in a space formed by the foldable housing 300. For example, the display 200 may be seated on a recess formed by the foldable housing 300 and may occupy most of the front surface of the electronic device 101. Thus, the front surface of the electronic device 101 may include the display 200 and a partial area of the first housing structure 310 and a partial area of the second housing structure 320, which are adjacent to the display 200. The rear surface of the electronic device 101 may include the first rear cover 380, a partial area of the first housing structure 310, which is adjacent to the first rear cover 380, the second rear cover 390, and a partial area of the second housing structure 320, which is adjacent to the second rear cover 390.

According to various embodiments, the display 200 may mean a display at least a portion of which may be transformed into a flat or curved surface. According to an embodiment, the display 200 may include a folding area 203, a first area 201 disposed on one side of the folding area 203 (e.g., the left side of the folding area 203 of FIG. 2), and a second area 202 disposed on the opposite side of the folding area 203 (e.g., the right side of the folding area 203 of FIG. 2).

However, the segmentation of the display 200 as shown in FIG. 2 is merely an example, and the display 200 may be divided into a plurality of (e.g., four or more, or two) areas depending on the structure or function of the display 200. For example, in the embodiment illustrated in FIG. 2, the display 200 may be divided into the areas by the folding area 203 or folding axis (e.g., axis A) extending in parallel with the y axis but, in another embodiment, the display 200 may be divided into the areas with respect to another folding area (e.g., a folding area parallel with the x axis) or another folding axis (e.g., a folding axis parallel with the x axis). According to an embodiment, the display 200 may be coupled with or disposed adjacent to a touch detection circuit, a pressure sensor capable of measuring the strength (pressure) of touches, and/or a digitizer for detecting a magnetic field-type stylus pen.

According to various embodiments, the first area 201 and the second area 202 may be overall symmetrical in shape with respect to the folding area 203. However, unlike the first area 201, the second area 202 may include a notch depending on the presence of the sensor area 326, but the rest may be symmetrical in shape with the first area 201. In other words, the first area 201 and the second area 202 may include symmetrical portions and asymmetrical portions.

Described below are the operation of the first housing structure 310 and the second housing structure 320 and each area of the display 200 depending on the state (e.g., the folded state, unfolded state, or intermediate state) of the electronic device 101.

According to various embodiments, when the electronic device 101 is in the unfolded state (e.g., FIG. 2), the first housing structure 310 and the second housing structure 320 may be disposed to face in the same direction while being angled at 180 degrees therebetween. The surface of the first area 201 and the surface of the second area 202 of the display 200 may be angled at 180 degrees therebetween while facing in the same direction (e.g., forward of the front surface of the electronic device). The folding area 203 may be coplanar with the first area 201 and the second area 202.

According to various embodiments, when the electronic device 101 is in the folded state (e.g., FIG. 3), the first housing structure 310 and the second housing structure 320 may face each other. The surface of the first area 201 and the surface of the second area 202 of the display 200 may be angled at a small angle (e.g., ranging from 0 degrees to 10 degrees) therebetween while facing each other. At least a portion of the folding area 203 may have a curved surface with a predetermined curvature.

According to various embodiments, in the intermediate state of the electronic device 101, the first housing structure 310 and the second housing structure 320 may be arranged at a certain angle therebetween. The surface of the first area 201 of the display 200 and the surface of the second area 202 may form an angle which is larger than the angle in the folded state and smaller than the angle in the unfolded state. The folding area 203 may at least partially have a curved surface with a predetermined curvature and, in this case, the curvature may be smaller than that when it is in the folded state.

According to various embodiments, the electronic device 101 may include an in-folding type or an out-folding type. The in-folding type may mean a state in which the flexible display 200 is not exposed to the outside in the fully folded state. As another example, it may mean a state in which the flexible display 200 is folded in the front direction. The out-folding type may mean a state in which the flexible display 200 is visually exposed to the outside in the fully folded state. As another example, it may mean a state in which the flexible display 200 is folded in the rear direction.

FIG. 4 is an exploded perspective view illustrating a foldable electronic device according to an embodiment of the disclosure.

Referring to FIG. 4, according to various embodiments, a foldable electronic device (hereinafter, the electronic device 101) may include a foldable housing 300, a flexible display (hereinafter, the display 200), a printed circuit board 520, and a plate 600. The foldable housing 300 may include a first housing structure 310, a second housing structure 320, a first rear cover 380 and a second rear cover 390, a bracket assembly 40, and a hinge structure 510. The first housing structure 310 may include a first housing 312 and a partial area (e.g., a first bracket 40a) of the bracket assembly 40. The second housing structure 320 may include a second housing 322 and a partial area (e.g., a second bracket 40b) of the bracket assembly 40.

According to various embodiments, the display 200 may include a display panel 200b (e.g., a flexible display panel) and one or more plates or layers (e.g., a supporting plate 240) on which the display panel 200b is seated. According to an embodiment, the supporting plate 240 may be disposed between the display panel 200b and the bracket assembly 40. An adhesive structure (not shown) may be positioned between the supporting plate 240 and the bracket assembly 40, attaching the supporting plate 240 and the bracket assembly 40.

According to various embodiments, the bracket assembly 40 may include a first bracket 40a and a second bracket 40b, and a hinge structure 510 may be disposed between the first bracket 40a and the second bracket 40b. The hinge structure 510 may include the hinge case 330 to cover the hinges disposed therein. As another example, a printed circuit board (e.g., a flexible printed circuit (FPC)) may be disposed to cross the first bracket 40a and the second bracket 40b.

According to various embodiments, the printed circuit board 520 may include a first main circuit board 521 disposed on a side of the first bracket 40a and a second main circuit board 522 disposed on a side of the second bracket 40b. The first main circuit board 521 and the second main circuit board 522 may be disposed in a space formed by the bracket assembly 40, the first housing structure 310, the second housing structure 320, the first rear cover 380, and the second rear cover 390. Components for implementing various functions of the electronic device 101 may be disposed on the first main circuit board 521 and the second main circuit board 522.

According to various embodiments, the first housing 312 and the second housing 322 may be assembled together to be coupled to two opposite sides of the bracket assembly 40, with the display 200 coupled to the bracket assembly 40. For example, the first housing 312 may be coupled by sliding from one side of the first bracket 40a, and the second housing 322 may be coupled by sliding from one side of the second bracket 40b.

According to various embodiments, the plate 600 may be disposed on the rear surface of the display 200. The plate 600 may be disposed on the rear surface of the display 200, and the rigidity of the display 200 may be enhanced. According to an embodiment, the plate 600 may be formed of a metal. A detailed description of the plate 600 is given below in detail along with the description of FIGS. 5A and 5B.

According to an embodiment, the first housing structure 310 may include a first rotation supporting surface 311 disposed on one end of the first housing 312, and the second housing structure 320 may include a second rotation supporting surface 321, corresponding to the first rotation supporting surface 311, disposed on one end of the second housing 322. The first rotation supporting surface 311 and the second rotation supporting surface 321 may include a curved surface corresponding to a curved surface included in the hinge case 330.

According to an embodiment, the first rotation supporting surface 311 and the second rotation supporting surface 321, in the unfolded state of the electronic device 101 (e.g., the electronic device of FIG. 2), may cover the hinge case 330, allowing the hinge case 330 to be not exposed or minimally exposed through the rear surface of the electronic device 101. As another example, the first rotation supporting surface 311 and the second rotation supporting surface 321, in the folded state of the electronic device 101 (e.g., the electronic device of FIG. 3), may rotate along the curved surface included in the hinge case 330, allowing the hinge case 330 to be maximally exposed through the rear surface of the electronic device 101.

Figure 5:
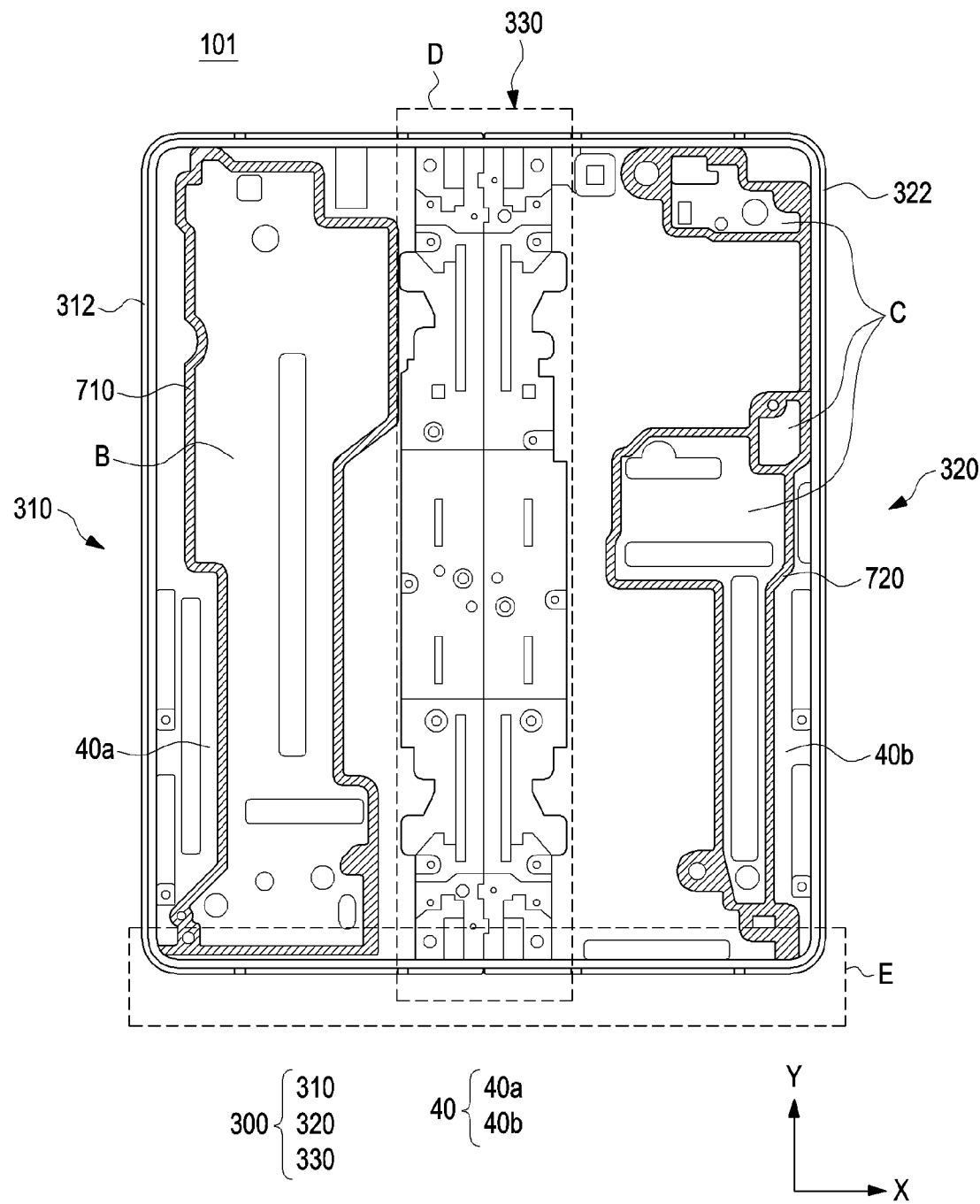
FIG. 5 is a plan view illustrating an inside of a foldable electronic device except for a plate and a flexible display according to an embodiment of the disclosure.

FIG. 5 is a plan view illustrating an inside of a foldable electronic device except for a plate and a flexible display according to an embodiment of the disclosure.

The electronic device 101, the foldable housing 300, the first housing structure 310, the first housing 312, the second housing structure 320, the second housing 322, the hinge case 330, the bracket assembly 40, the first bracket 40a, and the second bracket 40b disclosed in FIG. 5 may be identical or similar to the electronic device 101, the foldable housing 300, the first housing structure 310, the first housing 312, the second housing structure 320, the second housing 322, the hinge case 330, the bracket assembly 40, the first bracket 40a, and the second bracket 40b disclosed in FIGS. 2, 3, and 4. Accordingly, no description is given of the same components.

According to various embodiments, a first waterproofing member 710 may be disposed on the first bracket 40a. According to an embodiment, the first waterproofing member 710 may be disposed on at least a portion of the first bracket 40a. The first waterproofing member 710 may be disposed on the surface of the first bracket 40a to form at least one closed loop. The closed loop formed by the first waterproofing member 710 may be defined as a first waterproofing area B. The first waterproofing member 710 may prevent foreign objects including water from being introduced into the first waterproofing area B.

According to various embodiments, a second waterproofing member 720 may be disposed on the second bracket 40b. According to an embodiment, the second waterproofing member 720 may be disposed on at least a portion of the second bracket 40b. The second waterproofing member 720 may be disposed on the surface of the second bracket 40*b* to form at least one closed loop. According to an embodiment disclosed in FIG. 5, the second waterproofing member 720 may form at least three closed loops. The closed loop formed by the second waterproofing member 720 may be defined as a second waterproofing area C. The second waterproofing member 720 may prevent foreign objects including water from being introduced into the second waterproofing area C.

According to various embodiments, a non-waterproofing area D where no waterproofing member is disposed may be formed between the first waterproofing area B where the first waterproofing member 710 is disposed and the second waterproofing area C where the second waterproofing member 720 is disposed.

According to various embodiments, the first waterproofing member 710 and/or the second waterproofing member 720 may not be disposed in at least a portion of the lower end area E of the lower side (−Y-axis direction) of the electronic device 101.

Figure 6:
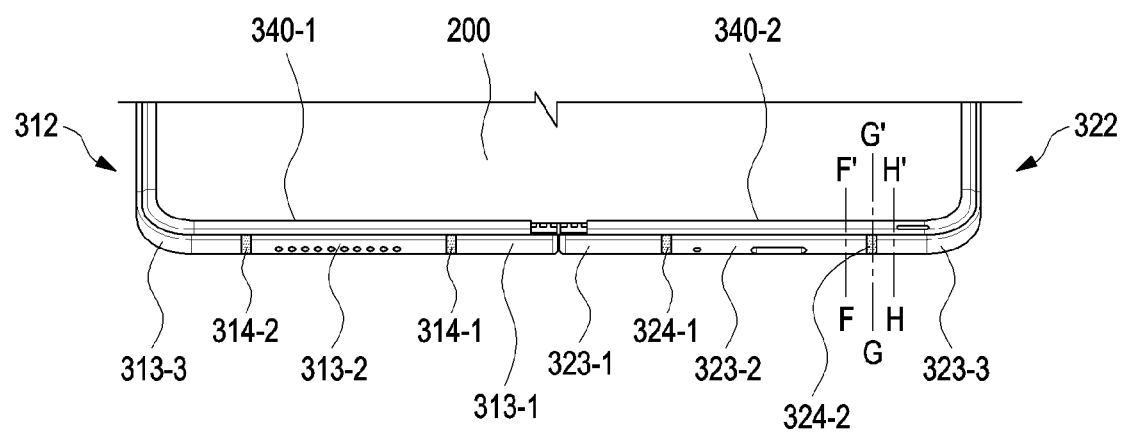
FIG. 6 is an enlarged perspective view illustrating a lower end area of FIG. 5 according to an embodiment of the disclosure.

FIG. 6 is an enlarged perspective view illustrating a lower end area of FIG. 5 according to an embodiment of the disclosure.

The display 200, the first housing 312, and the second housing 322 disclosed in FIG. 6 may be identical or similar to the display 200, the first housing 312, and the second housing 322 disclosed in FIGS. 2, 3, 4, and 5. Accordingly, no description is given of the same components.

FIG. 6 is an enlarged view illustrating the lower area E of the electronic device 101 of FIG. 5.

According to various embodiments, an injection member 340 may be disposed between the display 200 and the foldable housing 300. The injection member 340 may include a first injection member 340-1 and a second injection member 340-2. According to an embodiment, the first injection member 340-1 may be disposed between the display 200 and the first housing 312. The second injection member 340-2 may be disposed between the display 200 and the second housing 322.

According to various embodiments, at least a portion of the first housing 312 may serve as an antenna. A component, which is at least a portion of the first housing 312 and serves as an antenna, is defined as a first antenna 313. According to an embodiment, the first housing 312 may include a plurality of first antennas 313. According to an embodiment, the first antenna 313 may include a 1-1th antenna 313-1, a 1-2th antenna 313-2, and a 1-3th antenna 313-3. According to another embodiment, the first antenna 313 may include three or more antennas.

According to various embodiments, a plurality of first segmenters 314 may be disposed between the plurality of first antennas 313. The plurality of first segmenters 314 may be formed of an insulator that does not conduct electricity. The plurality of first segmenters 314 may include at least two segmenters. According to an embodiment, the plurality of first segmenters 314 may include a 1-1th segmenter 314-1 and a 1-2th segmenter 314-2. According to an embodiment, the 1-1th segmenter 314-1 may be disposed between the 1-1th antenna 313-1 and the 1-2th antenna 313-2. The 1-2th segmenter 314-2 may be disposed between the 1-2th antenna 313-2 and the 1-3th antenna 313-3. The plurality of first segmenters 314 may be disposed between the plurality of first antennas 313 to prevent electrical conduction between the plurality of first antennas 313. As electrical conduction is prevented between the plurality of first antennas 313, the electronic device 101 may transmit and receive radio waves of various frequencies.

According to various embodiments, at least a portion of the second housing 322 may serve as an antenna. A component, which is at least a portion of the second housing 322 and serves as an antenna, is defined as a second antenna 323. According to an embodiment, the second housing 322 may include a plurality of second antennas 323. According to an embodiment, the second antenna 323 may include a 2-1th antenna 323-1, a 2-2th antenna 323-2, and a 2-3th antenna 323-3. According to another embodiment, the second antenna 323 may include three or more antennas.

According to various embodiments, a plurality of second segmenters 324 may be disposed between the plurality of second antennas 323. The plurality of second segmenters 324 may be formed of an insulator that does not conduct electricity. The plurality of second segmenters 324 may include at least two or more segmenters. According to an embodiment, the plurality of second segmenters 324 may include a 2-1th segmenter 324-1 and a 2-2th segmenter 324-2. According to an embodiment, the 2-1th segmenter 324-1 may be disposed between the 2-1th antenna 323-1 and the 2-2th antenna 323-2. The 2-2th segmenter 324-2 may be disposed between the 2-2th antenna 323-2 and the 2-3th antenna 323-3. The plurality of second segmenters 324 may be disposed between the plurality of second antennas 323 to prevent electrical conduction between the plurality of second antennas 323. As electrical conduction is prevented between the plurality of first antennas 313, the electronic device 101 may transmit and receive radio waves of various frequencies.

Figure 7A:
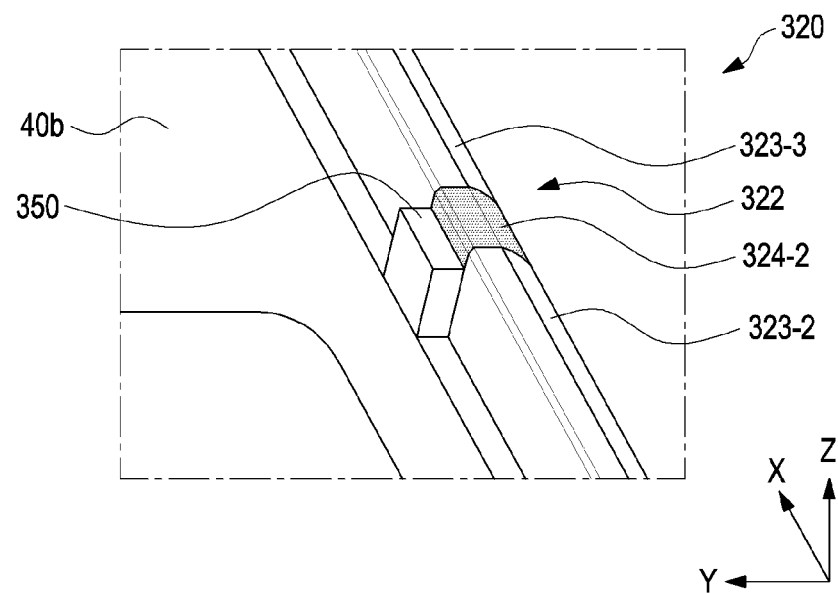
FIG. 7A is a perspective view illustrating a lower end area of FIG. 6 according to an embodiment of the disclosure.

FIG. 7A is a cross-sectional view taken along G-G' of FIG. 6 according to an embodiment of the disclosure.

Figure 7B:
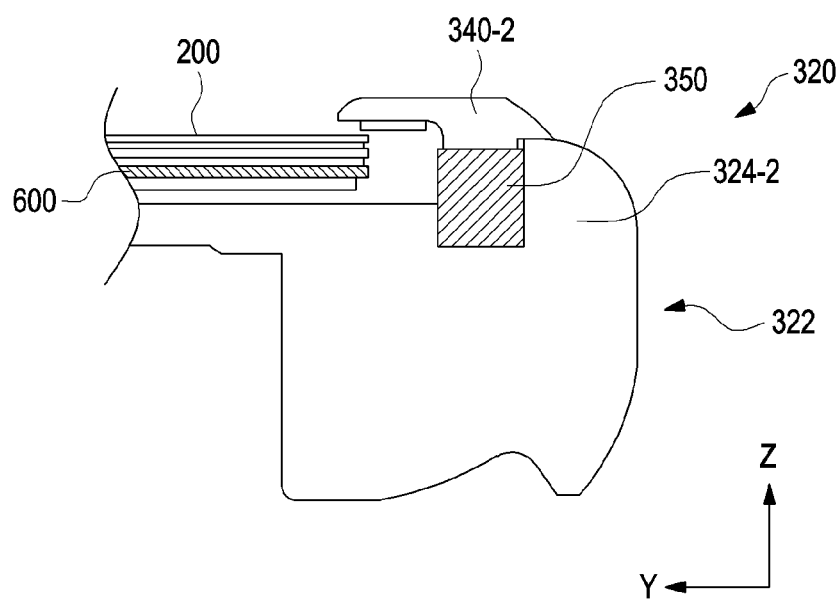
FIG. 7B is a cross-sectional view taken along G-G' of FIG. 6 according to an embodiment of the disclosure.

FIG. 7B is a perspective view illustrating a lower end area of FIG. 6 according to an embodiment of the disclosure.

The display 200, the second housing structure 320, the second housing 322, the 2-2th antenna 323-2, the 2-3th antenna 323-3, the 2-2th segmenter 324-2, the second injection member 340-2, the second bracket 40*b*, and the plate 600 disclosed in FIGS. 7A and 7B may be identical or similar to the display 200, the second housing structure 320, the second housing 322, the 2-2th antenna 323-2, the 2-3th antenna 323-3, the 2-2th segmenter 324-2, the second injection member 340-2, the second bracket 40*b*, and the plate 600 disclosed in FIGS. 2, 3, 4, 5, and 6. Accordingly, no description is given of the same components.

FIGS. 7A and 7B show only the 2-2th segmenter 324-2 for convenience of description. Accordingly, the technical configuration of the 2-2th segmenter 324-2 may be equally applied to the plurality of second segmenters 324.

FIGS. 7A and 7B show only the second housing structure 320 for convenience of description. The technical content of the disclosure is not limited only to the second housing structure 320, but may be equally applied to the first housing structure 310. Accordingly, the technical configuration for the plurality of second segmenters 324 of the second housing structure 320 may also be applied to the plurality of first segmenters 314 of the first housing structure 310.

For convenience of description, the display 200, the second injection member 340-2, and the plate 600 are omitted in FIG. 7A.

Referring to FIGS. 7A and 7B, according to various embodiments, a 2-2th segmenter 324-2 may be disposed between the 2-2th antenna 323-2 and the 2-3th antenna 323-3. As the 2-2th segmenter 324-2 is disposed between the 2-2th antenna 323-2 and the 2-3th antenna 323-3, the 2-2th antenna 323-2 and the 2-3th antenna 323-3 may be electrically separated. A separation member 350 may be disposed in the +Y-axis direction of the 2-2th segmenter 324-2. The separation member 350 may be disposed adjacent to a portion of the 2-2th segmenter 324-2 in the direction toward the flexible display 200.

According to various embodiments, the second injection member 340-2 may be disposed in the +Z-axis direction of the 2-2th antenna 323-2, the 2-3th antenna 323-3, the 2-2th segmenter 324-2, and the separation member 350. The display 200 may be disposed between the second injection member 340-2 and the second bracket 40b. The plate 600 may be disposed between the display 200 and the second bracket 40b.

According to various embodiments, the separation member 350 may be formed of an insulator that does not conduct electricity. The separation member 350 may be disposed to be attached to the 2-2th segmenter 324-2. According to an embodiment, the width (in the X-axis direction) of the separation member 350 may be formed to be smaller than the width (in the X-axis direction) of the 2-2th segmenter 324-2. The width (in the X-axis direction) of the separation member 350 may be formed to correspond to the width (in the X-axis direction) of the 2-2th segmenter 324-2. According to another embodiment, the width (in the X-axis direction) of the separation member 350 may be formed to be larger than the width (in the X-axis direction) of the 2-2th segmenter 324-2. According to another embodiment, the height (in the Z-axis direction) of the separation member 350 may be formed to be smaller than the height (in the Z-axis direction) of the 2-2th segmenter 324-2.

According to various embodiments, the separation member 350 may be disposed to cover at least a portion of one surface (surface in the +Y-axis direction) of the 2-2th segmenter 324-2. As the separation member 350 is disposed to cover at least a portion of the 2-2th segmenter 324-2, the material introduced into the electronic device 101 may be separated by the separation member 350. Accordingly, electrical conductance by a foreign object between the 2-2th antenna 323-2 and the 2-3th antenna 323-3 may be prevented. As the electrical conductance between the 2-2th antenna 323-2 and the 2-3th antenna 323-3 is prevented, degradation of the communication performance of the electronic device 101 due to the foreign object introduced into the electronic device 101 may be prevented.

According to various embodiments, the separation member 350 may be integrally formed with the 2-2th segmenter 324-2.

Figure 8A:
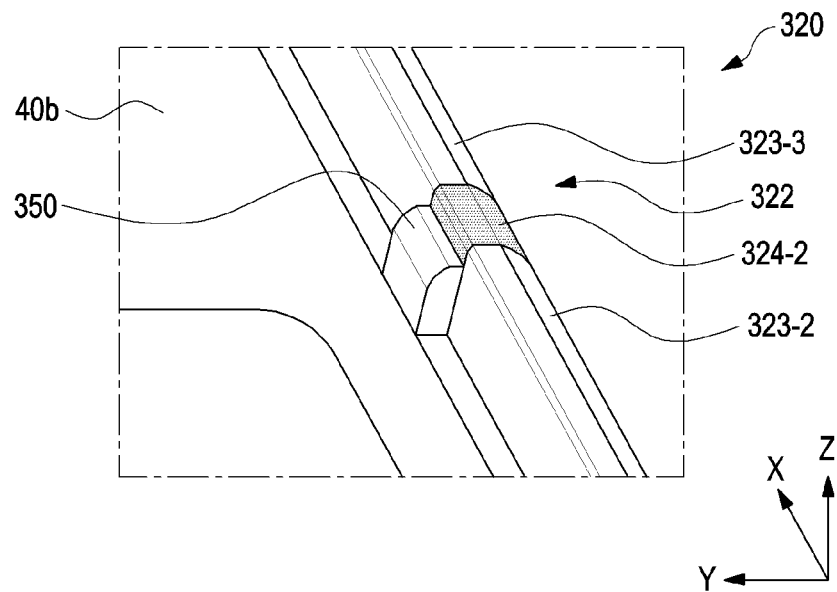
FIG. 8A is a perspective view illustrating a lower end area of FIG. 6 according to an embodiment of the disclosure.

FIG. 8A is a cross-sectional view taken along G-G' of FIG. 6 according to an embodiment of the disclosure.

Figure 8B:
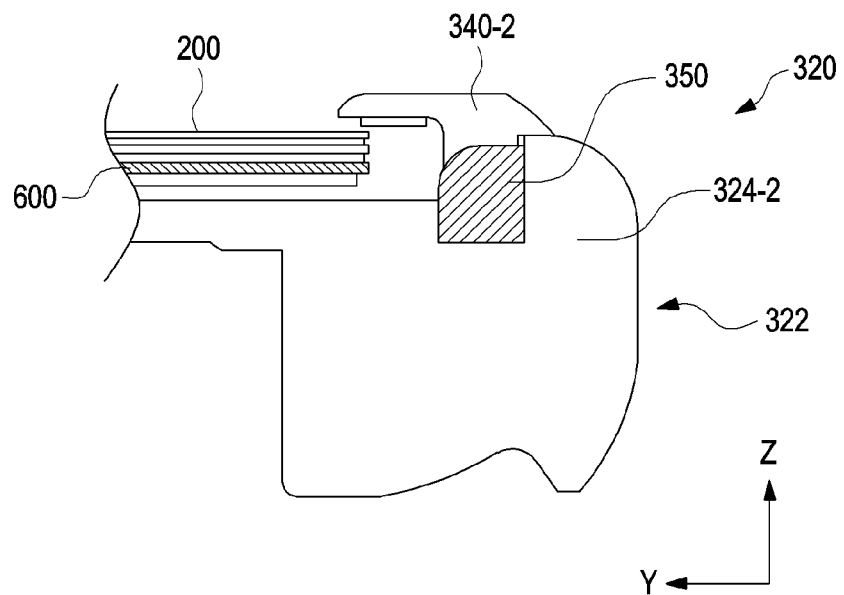
FIG. 8B is a cross-sectional view taken along G-G' of FIG. 6 according to an embodiment of the disclosure.

FIG. 8B is a perspective view illustrating a lower end area of FIG. 6 according to an embodiment of the disclosure.

The display 200, the second housing structure 320, the second housing 322, the 2-2th antenna 323-2, the 2-3th antenna 323-3, the 2-2th segmenter 324-2, the second injection member 340-2, the second bracket 40b, and the plate 600 disclosed in FIGS. 8A and 8B may be identical or similar to the display 200, the second housing structure 320, the second housing 322, the 2-2th antenna 323-2, the 2-3th antenna 323-3, the 2-2th segmenter 324-2, the second injection member 340-2, the second bracket 40b, and the plate 600 disclosed in FIGS. 2, 3, 4, 5, 6, 7A, and 7B. Accordingly, no description is given of the same components.

FIGS. 8A and 8B show only the 2-2th segmenter 324-2 for convenience of description. Accordingly, the technical configuration of the 2-2th segmenter 324-2 may be equally applied to the plurality of second segmenters 324.

FIGS. 8A and 8B show only the second housing structure 320 for convenience of description. The technical content of the disclosure is not limited only to the second housing structure 320, but may be equally applied to the first housing structure 310. Accordingly, the technical configuration for the plurality of second segmenters 324 of the second housing structure 320 may also be applied to the plurality of first segmenters 314 of the first housing structure 310.

For convenience of description, the display 200, the second injection member 340-2, and the plate 600 are omitted in FIG. 8A.

Referring to FIGS. 8A and 8B, according to various embodiments, a 2-2th segmenter 324-2 may be disposed between the 2-2th antenna 323-2 and the 2-3th antenna 323-3. As the 2-2th segmenter 324-2 is disposed between the 2-2th antenna 323-2 and the 2-3th antenna 323-3, the 2-2th antenna 323-2 and the 2-3th antenna 323-3 may be electrically separated. A separation member 350 may be disposed in the +Y-axis direction of the 2-2th segmenter 324-2. The separation member 350 may be disposed adjacent to a portion of the 2-2th segmenter 324-2 in the direction toward the flexible display 200.

According to various embodiments, the second injection member 340-2 may be disposed in the +Z-axis direction of the 2-2th antenna 323-2, the 2-3th antenna 323-3, the 2-2th segmenter 324-2, and the separation member 350. The display 200 may be disposed between the second injection member 340-2 and the second bracket 40b. The plate 600 may be disposed between the display 200 and the second bracket 40b.

According to various embodiments, the separation member 350 may be formed of an insulator that does not conduct electricity. The separation member 350 may be disposed to be attached to the 2-2th segmenter 324-2. According to an embodiment, the width (in the X-axis direction) of the separation member 350 may be formed to be smaller than the width (in the X-axis direction) of the 2-2th segmenter 324-2. The width (in the X-axis direction) of the separation member 350 may be formed to correspond to the width (in the X-axis direction) of the 2-2th segmenter 324-2. According to another embodiment, the width (in the X-axis direction) of the separation member 350 may be formed to be larger than the width (in the X-axis direction) of the 2-2th segmenter 324-2. According to another embodiment, the height (in the Z-axis direction) of the separation member 350 may be formed to correspond to the height (in the Z-axis direction) of the 2-2th segmenter 324-2.

According to various embodiments, the separation member 350 may be disposed to cover the whole of one surface (surface in the +Y-axis direction) of the 2-2th segmenter 324-2. As the separation member 350 is disposed to cover the whole of one surface (surface in the +Y-axis direction) of the 2-2th segmenter 324-2, the material introduced into the electronic device 101 may be separated by the separation member 350. Accordingly, electrical conductance by a foreign object between the 2-2th antenna 323-2 and the 2-3th antenna 323-3 may be prevented. As the electrical conductance between the 2-2th antenna 323-2 and the 2-3th antenna 323-3 is prevented, degradation of the communication performance of the electronic device 101 due to the foreign object introduced into the electronic device 101 may be prevented.

According to various embodiments, the separation member 350 may be integrally formed with the 2-2th segmenter 324-2.

Figure 9A:
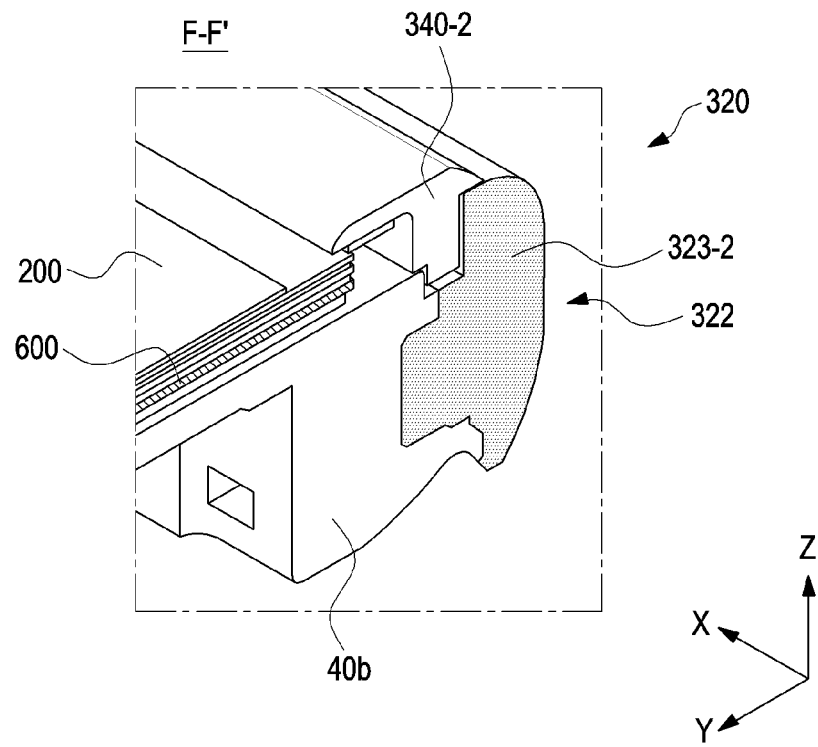
FIG. 9A is a cross-sectional view taken along F-F' of FIG. 6 according to an embodiment of the disclosure.
Figure 9B:
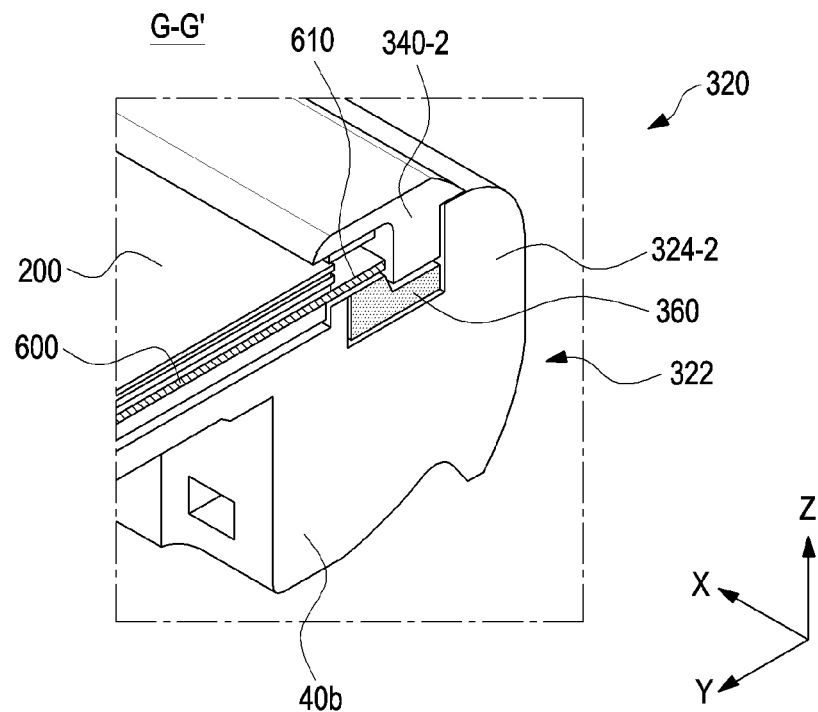
FIG. 9B is a cross-sectional view taken along G-G' of FIG. 6 according to an embodiment of the disclosure.
Figure 9C:
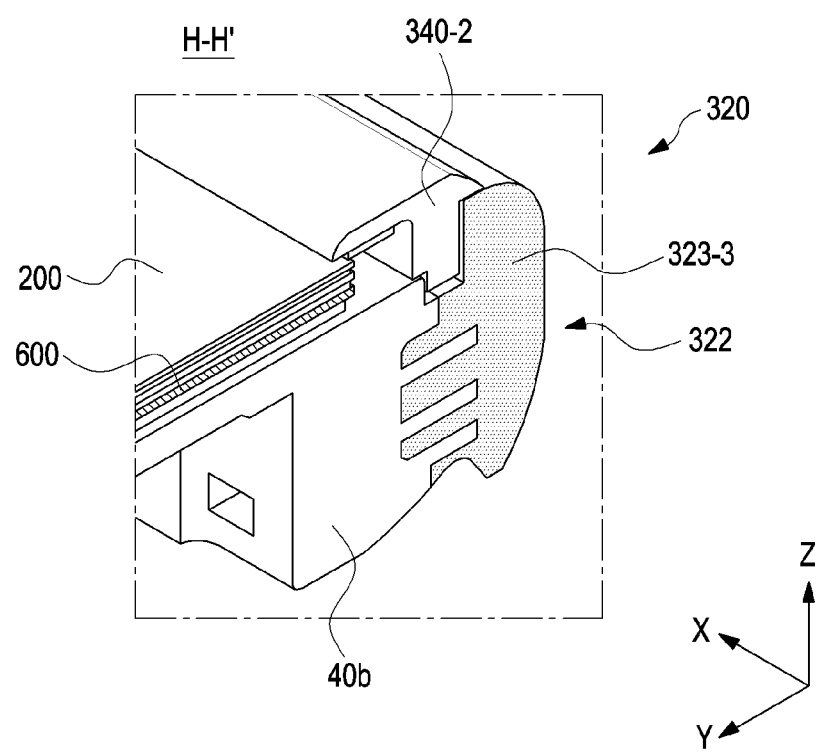
FIG. 9C is a cross-sectional view taken along H-H' of FIG. 6 according to an embodiment of the disclosure.

FIG. 9A is a cross-sectional view taken along F-F' of FIG. 6 according to an embodiment of the disclosure. FIG. 9B is a cross-sectional view taken along G-G' of FIG. 6 according to an embodiment of the disclosure. FIG. 9C is a cross-sectional view taken along H-H' of FIG. 6 according to an embodiment of the disclosure.

The display 200, the second housing structure 320, the second housing 322, the 2-2th antenna 323-2, the 2-3th antenna 323-3, the 2-2th segmenter 324-2, the second injection member 340-2, the second bracket 40b, and the plate 600 disclosed in FIGS. 9A, 9B, and 9C may be identical or similar to the display 200, the second housing structure 320, the second housing 322, the 2-2th antenna 323-2, the 2-3th antenna 323-3, the 2-2th segmenter 324-2, the second injection member 340-2, the second bracket 40b, and the plate 600 disclosed in FIGS. 2, 3, 4, 5, 6, 7A, 7B, 8A, and 8B. Accordingly, no description is given of the same components.

FIGS. 9A, 9B, and 9C show only the 2-2th segmenter 324-2 for convenience of description. Accordingly, the technical configuration of the 2-2th segmenter 324-2 may be equally applied to the plurality of second segmenters 324.

FIGS. 9A, 9B, and 9C show only the second housing structure 320 for convenience of description. The technical content of the disclosure is not limited only to the second housing structure 320, but may be equally applied to the first housing structure 310. Accordingly, the technical configuration for the plurality of second segmenters 324 of the second housing structure 320 may also be applied to the plurality of first segmenters 314 of the first housing structure 310.

Referring to FIGS. 9A, 9B, and 9C, according to various embodiments, a 2-2th segmenter 324-2 may be disposed between the 2-2th antenna 323-2 and the 2-3th antenna 323-3. As the 2-2th segmenter 324-2 is disposed between the 2-2th antenna 323-2 and the 2-3th antenna 323-3, the 2-2th antenna 323-2 and the 2-3th antenna 323-3 may be electrically separated.

According to various embodiments, the second injection member 340-2 may be disposed in the +Z-axis direction of the 2-2th antenna 323-2, the 2-3th antenna 323-3, and the 2-2th segmenter 324-2. The display 200 may be disposed between the second injection member 340-2 and the second bracket 40b. The plate 600 may be disposed between the display 200 and the second bracket 40b.

Referring to FIG. 9B, according to various embodiments, at least one portion of the plate 600 may have a plate protrusion 610 to protrude from the plate 600 to the 2-2th segmenter 342-2 (in the −Y-axis direction).

Referring to FIG. 9B, according to various embodiments, an adhesive member 360 may be disposed between the second injection member 340-2 and the second bracket 40b. The adhesive member 360 may be disposed on the Y-Z plane on which the 2-2th segmenter 324-2 is disposed. The adhesive member 360 may be formed such that at least a portion thereof protrudes toward the plate protrusion 610 (in the +Z-axis direction). At least a portion of the adhesive member 360 may be formed to contact the plate protrusion 610. The adhesive member 360 may be formed of an insulator that does not conduct electricity.

According to various embodiments, as the plate protrusion 610 is formed to protrude toward the 2-2th segmenter 342-2 (in the −Y-axis direction), and at least a portion of the adhesive member 360 is formed to protrude toward the plate protrusion 610 (in the +Z-axis direction), the material introduced into the electronic device 101 may be separated by the adhesive member 360. Accordingly, electrical conductance due to the foreign object introduced into the electronic device 101 between the 2-2th antenna 323-2 and the 2-3th antenna 323-3 may be prevented. As the electrical conductance between the 2-2th antenna 323-2 and the 2-3th antenna 323-3 is prevented, degradation of the communication performance of the electronic device 101 may be prevented.

Figure 10A:
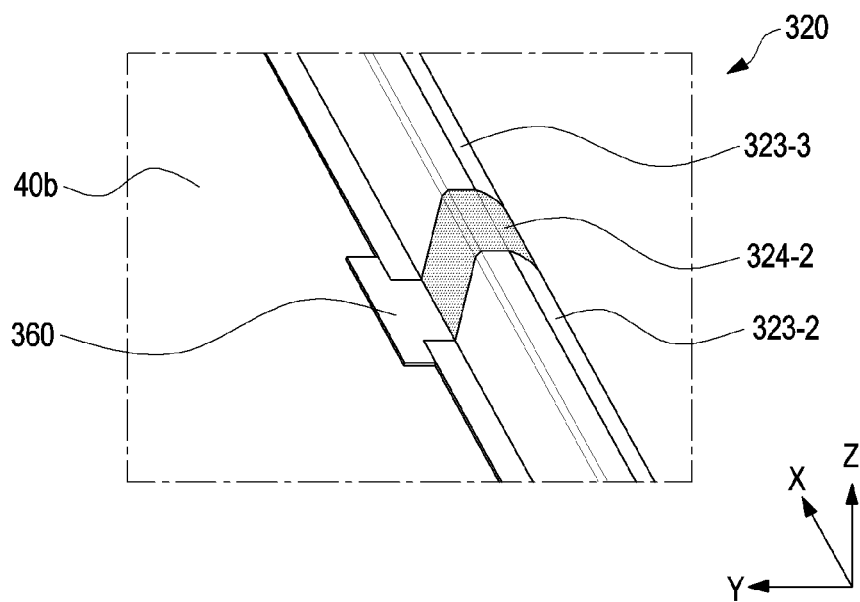
FIG. 10A is a perspective view illustrating a lower end area of FIG. 6 according to an embodiment of the disclosure.
Figure 10B:
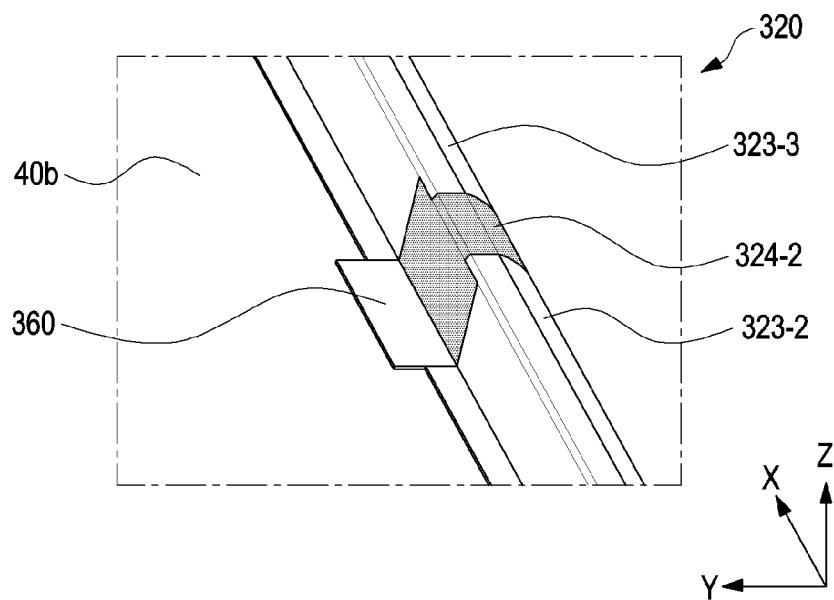
FIG. 10B is a perspective view illustrating a lower end area of FIG. 6 according to an embodiment of the disclosure.

FIG. 10A is a perspective view illustrating a lower end area of FIG. 6 according to an embodiment of the disclosure. FIG. 10B is a perspective view illustrating a lower end area of FIG. 6 according to an embodiment of the disclosure.

The second housing structure 320, the second housing 322, the 2-2th antenna 323-2, the 2-3th antenna 323-3, the 2-2th segmenter 324-2, the adhesive member 360, and the second bracket 40b disclosed in FIGS. 10A and 10B may be identical or similar to the second housing structure 320, the second housing 322, the 2-2th antenna 323-2, the 2-3th antenna 323-3, the 2-2th segmenter 324-2, the adhesive member 360, and the second bracket 40b disclosed in FIGS. 2, 3, 4, 5, 6, 7A, 7B, 8A, 8B, 9A, 9B, and 9C. Accordingly, no description is given of the same components.

FIGS. 10A and 10B show only the 2-2th segmenter 324-2 for convenience of description. Accordingly, the technical configuration of the 2-2th segmenter 324-2 may be equally applied to the plurality of second segmenters 324.

FIGS. 10A and 10B show only the second housing structure 320 for convenience of description. The technical content of the disclosure is not limited only to the second housing structure 320, but may be equally applied to the first housing structure 310. Accordingly, the technical configuration for the plurality of second segmenters 324 of the second housing structure 320 may also be applied to the plurality of first segmenters 314 of the first housing structure 310.

Referring to FIGS. 10A and 10B, according to various embodiments, the adhesive member 360 may be disposed between the 2-2th segmenter 324-2 and the second bracket 40b. The adhesive member 360 may be disposed on the Y-Z plane on which the 2-2th segmenter 324-2 is disposed. The adhesive member 360 may be formed of an insulator that does not conduct electricity.

According to various embodiments, as the plate protrusion 610 is formed to protrude toward the 2-2th segmenter 342-2 (in the −Y-axis direction), and at least a portion of the adhesive member 360 is formed to protrude toward the plate protrusion 610 (in the +Y-axis direction), the material introduced into the electronic device 101 may be separated by the adhesive member 360. Accordingly, electrical conductance due to the foreign object introduced into the electronic device 101 between the 2-2th antenna 323-2 and the 2-3th antenna 323-3 may be prevented.

According to various embodiments, the adhesive member 360 may be formed of an insulator that does not conduct electricity. The adhesive member 360 may be disposed to be attached to the 2-2th segmenter 324-2 and the second injection member 340-2.

According to various embodiments, the width (in the X-axis direction) of at least one portion of the adhesive member 360 may be formed to correspond to the width (in the X-axis direction) of the 2-2th segmenter 324-2. According to another embodiment, the width (in the X-axis direction) of the adhesive member 360 may be formed to be larger than the width (in the X-axis direction) of the 2-2th segmenter 324-2. Accordingly, electrical conductance by a foreign object between the 2-2th antenna 323-2 and the 2-3th antenna 323-3 may be prevented.

According to various embodiments, at least a portion of the adhesive member 360 may be formed to protrude in the +Z-axis direction. Accordingly, electrical conductance by a foreign object between the 2-2th antenna 323-2 and the 2-3th antenna 323-3 may be prevented.

According to various embodiments, the adhesive member 360 may be disposed to cover the whole of one surface (surface in the +Y-axis direction) of the 2-2th segmenter 324-2. Accordingly, electrical conductance by a foreign object between the 2-2th antenna 323-2 and the 2-3th antenna 323-3 may be prevented.

According to various embodiments, at least a portion of the adhesive member 360 may be formed to be drawn into at least a portion of the second bracket 40b. Accordingly, electrical conductance by a foreign object between the 2-2th antenna 323-2 and the 2-3th antenna 323-3 may be prevented. As the electrical conductance due to a foreign object between the 2-2th antenna 323-2 and the 2-3th antenna 323-3 is prevented, degradation of the communication performance of the electronic device 101 due to the foreign object introduced into the electronic device 101 may be prevented.

According to various embodiments, the width (in the X-axis direction) of at least a portion of the end, in the direction (+Y-axis direction) to the second bracket 40b, of the 2-2th segmenter 324-2 may be larger than the width (in the X-axis direction) of another portion of the 2-2th segmenter 324-2. According to an embodiment, the width of a portion of the 2-2th segmenter 324-2 in contact with the adhesive member 360 may be larger than the width of a portion of the 2-2th segmenter 324-2 not in contact with the adhesive member 360.

According to various embodiments, the width (in the X-axis direction) of the adhesive member 360 may be formed to correspond to the maximum width (in the X-axis direction) of the 2-2th segmenter 324-2. As described above, as the width (in the X-axis direction) of the adhesive member 360 is formed to correspond to the maximum width (in the X-axis direction) of the 2-2th segmenter 324-2, the foreign object introduced into the electronic device 101 may be separated by the adhesive member 360. As the foreign object is separated by the adhesive member 360, degradation of the electrical conduction between the 2-2th antenna 323-2 and the 2-3th antenna 323-3 may be prevented so that degradation of the communication performance of the electronic device 101 may be prevented.

Figure 11A:
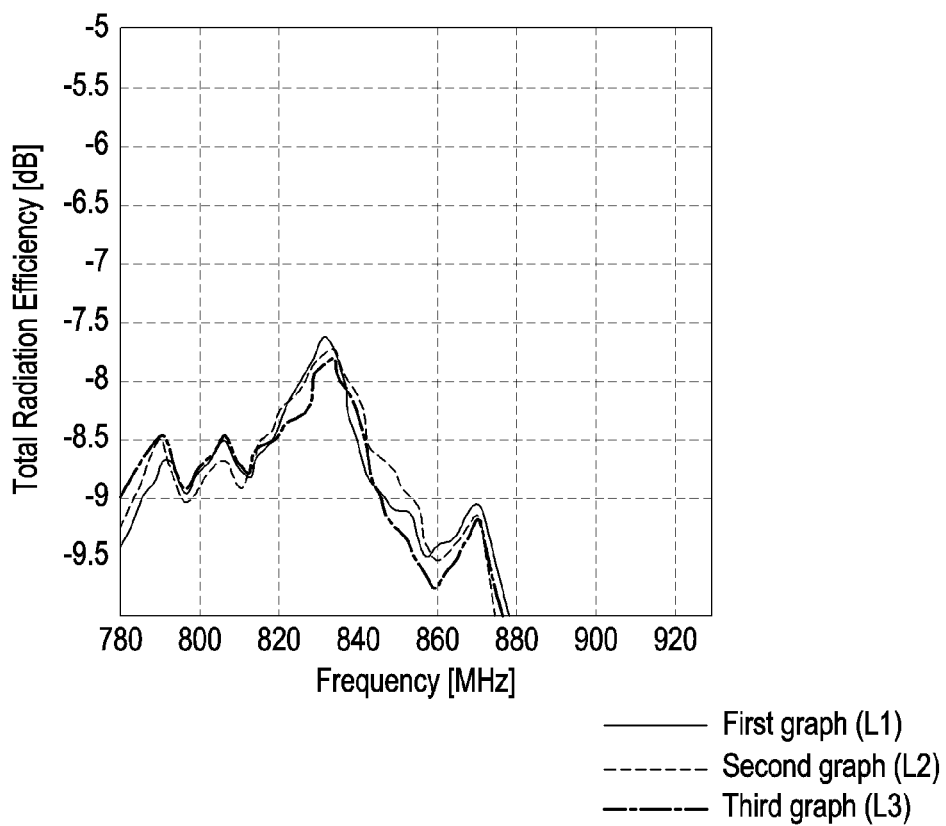
FIGS. 11A, 11B, and 11C are graphs illustrating the communication performance per frequency for an electronic device free from a foreign object, an electronic device adopting a foreign object-introduced separation member, and an electronic device adopting a foreign object-introduced adhesive member, according to various embodiments of the disclosure.
Figure 11B:
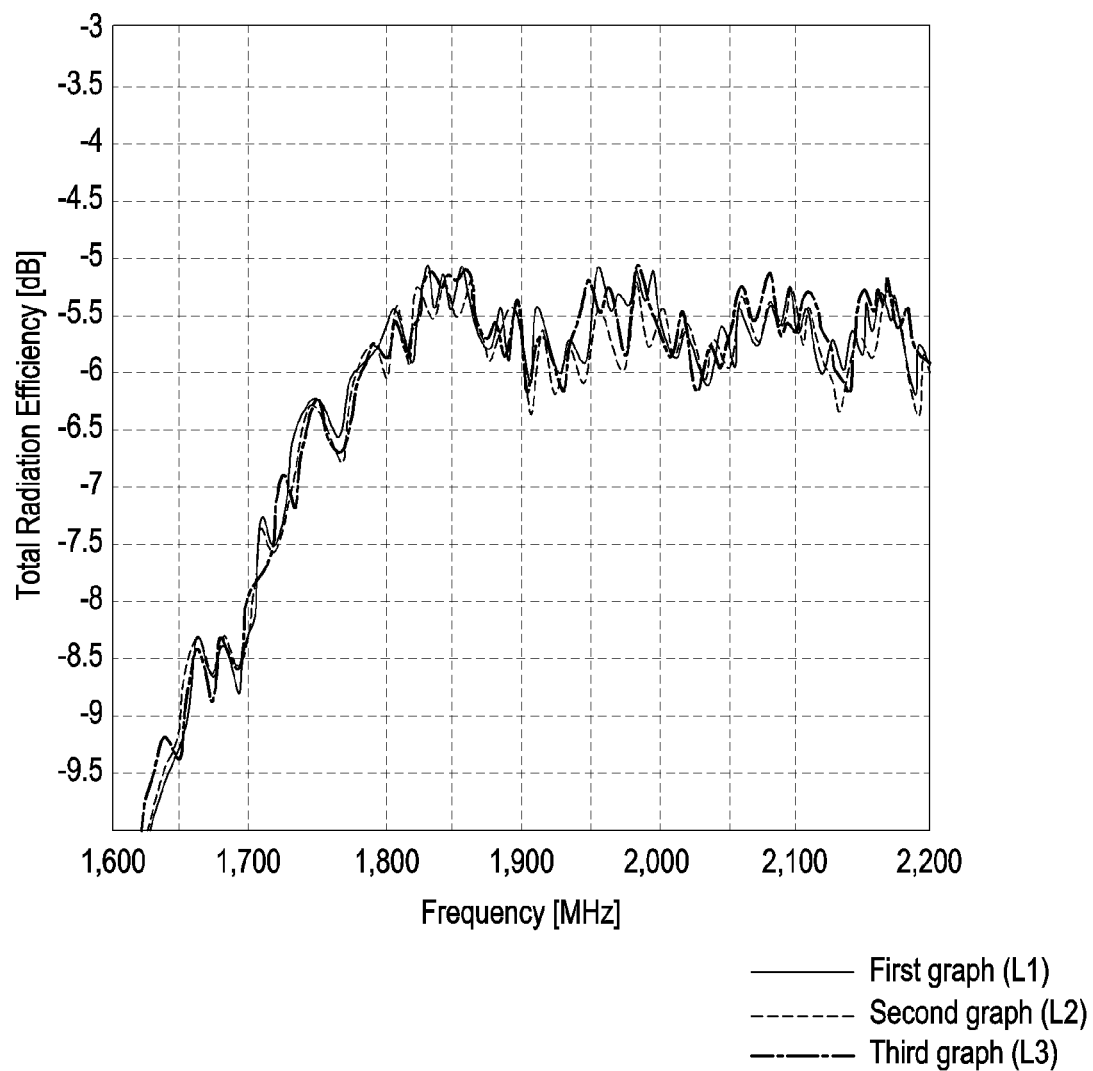
Figure 11C:
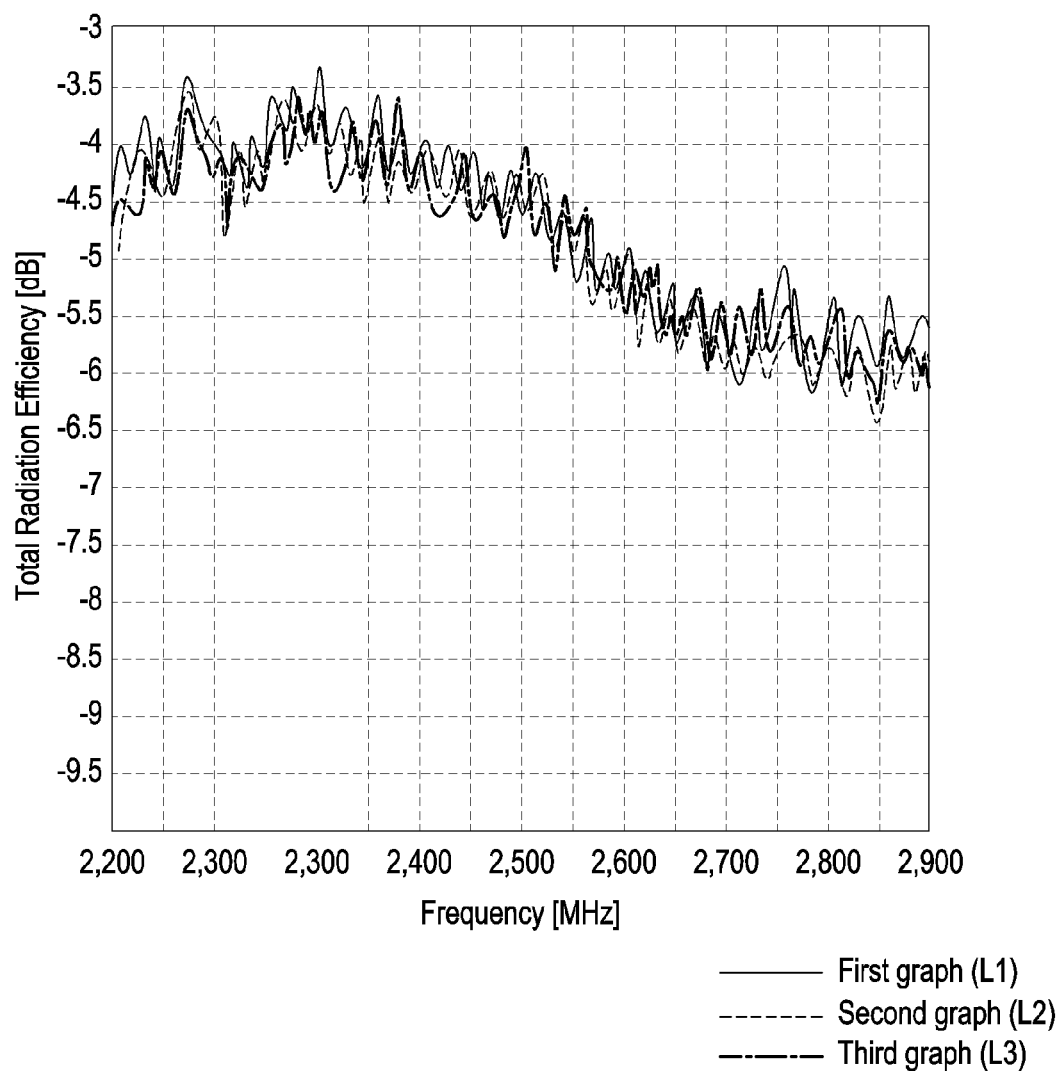

FIGS. 11A, 11B, and 11C are graphs illustrating the communication performance per frequency for an electronic device free from a foreign object, an electronic device adopting a foreign object-introduced separation member, and an electronic device adopting a foreign object-introduced adhesive member, according to various embodiments of the disclosure.

Referring to FIGS. 11A, 11B, and 11C, according to various embodiments, the X-axis denotes the frequency (Hz), and the Y-axis denotes the transmission/reception efficiency (dB).

According to various embodiments, the communication performance of the electronic device 101 with no foreign object introduced is shown in a first graph L1. The communication performance of the electronic device 101 adopting a foreign object-introduced separation member 350 is shown in a second graph L2. The communication performance of the electronic device 101 adopting a foreign object-introduced adhesive member 360 is shown in a third graph L3.

According to various embodiments, it may be identified that the shape of the first graph L1 is not significantly different from the shapes of the second graph L2 and the third graph L3. Accordingly, it may be identified that even when a foreign object is introduced, the communication performance of the electronic device 101 adopting the separation member 350 and/or the electronic device 101 adopting the foreign object-introduced adhesive member 360 is not degraded.

Figure 12:
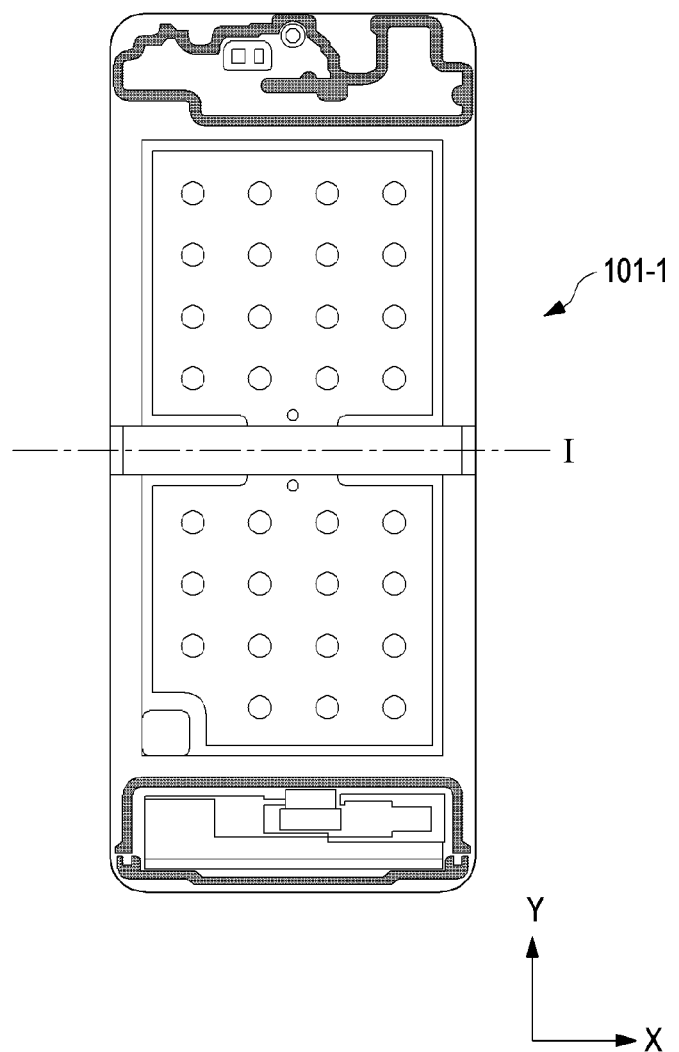
FIG. 12 is a plan view illustrating an electronic device except for a display according to an embodiment of the disclosure.

FIG. 12 is a plan view illustrating an electronic device except for a display according to an embodiment of the disclosure.

In the electronic device 101 illustrated in FIG. 2, the folding axis A is disposed parallel to the Y axis and, in an electronic device 101-1 illustrated in FIG. 12, the folding axis I is disposed parallel to the X axis.

The technical content applied to the electronic device 101 described in connection with FIGS. 2, 3, 4, 5, 6, 7A, 7B, 8A, 8B, 9A, 9B, 9C, 10A, and 10B may be applied to the electronic device 101-1 shown in FIG. 12.

According to various embodiments of the disclosure, an electronic device (e.g., the electronic device 101 of FIG. 4) may comprise a first housing (e.g., the first housing 312 of FIG. 4), a second housing (e.g., the second housing 322 of FIG. 4) connected with the first housing by a hinge structure (e.g., the hinge case 330 of FIG. 4) and providing a motion relative to the first housing, and a flexible display (e.g., the display 200 of FIG. 4) disposed from the first housing through the hinge structure to the second housing. At least a portion of at least one of the first housing or the second housing may include at least two antennas (e.g., the first antenna 313 or second antenna 323 of FIG. 6) and a segmenter (e.g., the plurality of first segmenters 314 or the plurality of second segmenters 324 of FIG. 6) disposed between the antennas. A separation member (e.g., the separation member 350 of FIG. 7A) may be disposed adjacent to a portion of the segmenter in a direction to the flexible display. At least a portion of the separation member may protrude beyond the antennas toward the flexible display.

According to various embodiments, the separation member may be disposed to contact the segmenter.

According to various embodiments, a width of the separation member may be formed to correspond to a width of the segmenter.

According to various embodiments, a width of the separation member may be formed to be larger than a width of the segmenter.

According to various embodiments, a height of the separation member may be smaller than a height of the segmenter.

According to various embodiments, a height of the separation member may be formed to correspond to a height of the segmenter.

According to various embodiments, the separation member may be disposed to contact at least some of the antennas.

According to various embodiments, the electronic device may further comprise an injection member (e.g., the injection member 340 of FIG. 6) disposed on a surface of at least a portion of the flexible display.

According to various embodiments, the separation member and the segmenter may be integrally formed with each other.

According to various embodiments, the separation member and the segmenter may be formed of an insulator.

According to various embodiments of the disclosure, an electronic device (e.g., the electronic device 101 of FIG. 4) may comprise a first housing (e.g., the first housing 312 of FIG. 4), a second housing (e.g., the second housing 322 of FIG. 4) connected with the first housing by a hinge structure (e.g., the hinge case 330 of FIG. 4) and providing a motion relative to the first housing, a flexible display (e.g., the display 200 of FIG. 4) disposed from the first housing through the hinge structure to the second housing, and a plate (e.g., the plate 600 of FIG. 4) disposed on a lower surface of the flexible display. At least a portion of at least one of the first housing or the second housing may include at least two antennas (e.g., the first antenna 313 or second antenna 323 of FIG. 6) and a segmenter (e.g., the plurality of first segmenters 314 or the plurality of second segmenters 324 of FIG. 6) disposed between the antennas. At least one adhesive member (e.g., the adhesive member 360 of FIG. 9B) may be disposed between at least one of the first housing or the second housing and the plate. The plate may include a plate protrusion (e.g., the plate protrusion 610 of FIG. 9B) formed to protrude toward the antennas.

At least a portion of the adhesive member may be formed to protrude toward the protrusion.

According to various embodiments, at least a portion of the adhesive member may be disposed to contact the plate protrusion.

According to various embodiments, the electronic device may further comprise an injection member disposed on a surface of at least a portion of the flexible display.

According to various embodiments, the adhesive member may be disposed between the injection member and at least one of the first housing or the second housing.

According to various embodiments, the adhesive member may be disposed to contact the injection member and at least one of the first housing or the second housing.

According to various embodiments, the plate protrusion may be disposed to correspond to a position of the segmenter.

According to various embodiments, the adhesive member may be disposed to contact the segmenter.

According to various embodiments, a width of at least a portion of the adhesive member may be formed to be larger than a width of the segmenter.

According to various embodiments, the adhesive member and the segmenter may be formed of an insulator.

According to various embodiments, a width of a portion of the segmenter contacting the adhesive member may be formed to be larger than a width of another portion of the segmenter not contacting the adhesive member.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. An electronic device comprising:
    a first housing;
    a second housing connected to the first housing by a hinge structure and providing a motion relative to the first housing; and
    a flexible display extending from the first housing through the hinge structure to the second housing,
    wherein at least a portion of at least one of the first housing or the second housing includes at least two antennas and a segmenter disposed between the at least two antennas,
    wherein a separation member is disposed adjacent to a portion of the segmenter in a direction toward the flexible display, and
    wherein at least a portion of the separation member protrudes beyond the at least two antennas toward the flexible display.

2. The electronic device of claim 1, wherein the separation member contacts the segmenter.

3. The electronic device of claim 1, wherein a width of the separation member corresponds to a width of the segmenter.

4. The electronic device of claim 1, wherein a width of the separation member is larger than a width of the segmenter.

5. The electronic device of claim 1, wherein a height of the separation member is smaller than a height of the segmenter.

6. The electronic device of claim 1, wherein a height of the separation member corresponds to a height of the segmenter.

7. The electronic device of claim 1, wherein the separation member contacts at least some of the at least two antennas.

8. The electronic device of claim 1, further comprising:
    an injection member disposed on a surface of at least a portion of the flexible display.

9. The electronic device of claim 1, wherein the separation member and the segmenter are integrally formed with each other.

10. The electronic device of claim 1, wherein the separation member and the segmenter comprise an insulator.

11. An electronic device comprising:
    a first housing;
    a second housing connected to the first housing by a hinge structure and providing a motion relative to the first housing;
    a flexible display extending from the first housing through the hinge structure to the second housing; and
    a plate disposed on a lower surface of the flexible display,
    wherein at least a portion of at least one of the first housing or the second housing includes at least two antennas and a segmenter disposed between the at least two antennas,
    wherein at least one adhesive member is disposed between at least one of the first housing or the second housing and the plate,
    wherein the plate includes a plate protrusion protruding toward the at least two antennas, and
    wherein at least a portion of the at least one adhesive member protrudes toward the plate protrusion.

12. The electronic device of claim 11, wherein at least a portion of the at least one adhesive member contacts the plate protrusion.

13. The electronic device of claim 11, further comprising:
    an injection member disposed on a surface of at least a portion of the flexible display.

14. The electronic device of claim 13, wherein the at least one adhesive member is disposed between the injection member and at least one of the first housing or the second housing.

15. The electronic device of claim 13, wherein the at least one adhesive member contacts the injection member and at least one of the first housing or the second housing.

16. The electronic device of claim 11, wherein the plate protrusion is disposed at a position corresponding to a position of the segmenter.

17. The electronic device of claim 11, wherein the at least one adhesive member contacts the segmenter.

18. The electronic device of claim 11, wherein a width of at least a portion of the at least one adhesive member is larger than a width of the segmenter.

19. The electronic device of claim 11, wherein the at least one adhesive member and the segmenter comprise an insulator.

20. The electronic device of claim 11, wherein a width of a first portion of the segmenter contacting the at least one adhesive member is larger than a width of a second portion of the segmenter not contacting the at least one adhesive member.

* * * * *